US007450084B2

(12) United States Patent
Fuller et al.

(10) Patent No.: US 7,450,084 B2
(45) Date of Patent: Nov. 11, 2008

(54) SYSTEM AND METHOD FOR MANAGING COMPUTER MONITOR CONFIGURATIONS

(75) Inventors: Andrew J. Fuller, Redmond, WA (US); Jerry R. Hughson, Jr., Bothell, WA (US); Matthew P. Rhoten, Kirkland, WA (US); Michael Milirud, Bellevue, WA (US); Kurt A. Geisel, Redmond, WA (US); Roger H. Wynn, Redmond, WA (US); Kevin P. Paulson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 11/017,198

(22) Filed: Dec. 17, 2004

(65) Prior Publication Data

US 2006/0132473 A1    Jun. 22, 2006

(51) Int. Cl.
G09G 5/00    (2006.01)
(52) U.S. Cl. .............................. 345/1.1; 345/3.1; 345/5; 345/213; 713/100; 713/104
(58) Field of Classification Search ................... 345/1.1, 345/3.1, 5, 213, 428; 713/100, 104
See application file for complete search history.

(56) References Cited

U.S. PATENT DOCUMENTS 5,488,385 A * 1/1996 Singhal et al. ............... 345/3.1
6,049,316 A * 4/2000 Nolan et al. ................. 345/698
6,462,727 B2 * 10/2002 Shin ............................ 345/99
6,697,033 B1 * 2/2004 Leung et al. .................. 345/5
6,928,543 B2 * 8/2005 Hendry et al. .............. 713/100

* cited by examiner

Primary Examiner—Richard Hjerpe
Assistant Examiner—Leonid Shapiro
(74) Attorney, Agent, or Firm—Workman Nydegger

(57) ABSTRACT

Described is a method and system a system and method for dynamically and intelligently configuring a computer system's video-related settings upon connection of a monitor, and/or reconfiguring upon disconnection. A monitor configuration may include one or more display mechanisms, their video settings, relative positioning, and may include power scheme data. When a monitor is plugged into or unplugged from a computer system, a monitor manager component is notified and determines the current configuration, such as based on monitor identifiers. The current configuration is searched against persisted monitor configurations seeking a match. If previous monitor configuration data is found, the previous monitor configuration is applied. If not an exact match, configuration data is constructed based on similar configuration data that is persisted, or by querying for capabilities and iterating as necessary to find a video mode that the video card and monitor can use.

20 Claims, 10 Drawing Sheets to FIG. 10

SYSTEM AND METHOD FOR MANAGING COMPUTER MONITOR CONFIGURATIONS

FIELD OF THE INVENTION

The invention relates generally to computer systems, and more particularly to managing computer displays and other display mechanisms.

BACKGROUND OF THE INVENTION

Certain computer system users, particularly users of mobile computing devices such as laptop computers, often need to connect their computer systems to different display mechanisms, such as display monitors (or simply monitors). For example, although a laptop computer has an internal monitor, a computer user may connect a laptop computer to a large monitor or equivalent projection device when giving a presentation. Other examples include a user that connects a mobile computer to one monitor at work and a different monitor at home. Indeed, certain types of mobile computer systems have been designed without any monitor, and are intended to be moved between destinations where they connect to a monitor at each destination.

Moreover, although not widely known, contemporary operating systems (such as Microsoft Corporation's Windows® XP operating system) support multiple monitors in various ways, including in a way that allows the multiple monitors' screens to be used as one larger screen. In other words, rather than simultaneously displaying the same image on two or more monitors or the like (referred to as clone mode), the operating system extends the monitors connected to the installed video cards (or a multiple-headed card) to act as a single desktop, over which the user can move the mouse pointer and drag program windows between monitors. In this extended-screen mode, the operating system maintains separate software-managed settings for each monitor, e.g., resolution, refresh rate, color depth and so forth. There are also situations, such as with gaming applications, in which multiple monitors may be used for a single application that spans the monitors; in this span mode, the monitors typically have the same settings.

Thus, users have a great deal of flexibility in the ways in which they may connect a computer system to one or more display mechanisms. However, any time there is a change to a computer system's current configuration of display mechanisms, e.g., a monitor is connected or disconnected, a possibly significant amount of user action is required to adjust for the change. This requires the user to have knowledge as to how to change settings based on the reconfiguration, and sometimes requires that the user memorize or experiment with desired settings.

One reason for this reconfiguration requirement is that there are many types of display mechanisms to which a user can connect, many having different capabilities, screen sizes and so forth. Another reason that some computer systems have multiple users, and each user may want different settings. While some users may not mind reconfiguring settings when changing from a work monitor to a home monitor or vice-versa, or whenever logging in after a different user logs out, other users are not knowledgeable enough to make the desired changes, or do not bother changing, e.g., a user tolerates another user's preferences, or uses the same settings at two locations (a "lowest-common-denominator" solution, even though other settings with one of the monitors would be preferable). In other situations, even sophisticated computer users may not know anything about a particular display mechanism to which they need to connect, such as a user giving a presentation who needs to connect to whatever large monitor or projection device is made available. Moreover, in the near future, it is likely that many television sets and airplane-installed displays will provide computer connections to serve as computer monitors, whereby air travelers and/or travelers staying in hotel rooms and the like will connect to the television or display, requiring a reconfiguration of the computer's video settings to adapt to that television or display. Note that a preset solution is not feasible; for example, because of different circumstances, there will be many varieties of such display mechanisms, each with different capabilities, e.g., a hotel room television is almost certain to be larger than a display built into an airplane seat.

In practice, when connecting to a particular display mechanism, resolution, color depth and refresh rate are all variables that a user may need or want to reconfigure. These settings are determined by the display mechanism's capabilities in conjunction with the capabilities of the video card (or cards) installed in the computer system. Screen size is another reason to change existing settings, as the viewable objects that look good on one display mechanism may be too small or too large when used with another display mechanism's settings. Power consumption is yet another factor that needs to be considered, because having certain settings (e.g., a higher refresh rate) consumes more power than others, and may be undesirable when trying to conserve battery life.

In sum, there are numerous ways to configure computer systems for operating with display mechanisms, and there are numerous types of display mechanisms to which a user may connect. There are also a variety of options when multiple display mechanisms are available for connecting to a computer system. What is needed is a way to simplify the user experience when connecting to one or more display mechanisms, yet do so in a flexible manner that handles many possible user scenarios and gives users desirable results.

SUMMARY OF THE INVENTION

Briefly, the present invention provides a system and method for dynamically and intelligently configuring a computer system's monitor-related settings upon connection of a monitor or other display mechanism, and/or reconfiguring upon disconnection. The present invention not only changes the settings change for a particular display mechanism, but may do so for a monitor configuration as a whole, which includes the concept of one or more display mechanisms and their respective video settings and modes, along with information such as the relative positioning of monitor screens with respect to each other, and information that affects their video modes (e.g., a power scheme). Note that as used herein, the terms "monitor" and "display mechanism" are equivalent and generally used interchangeably, (even though in certain other circumstances a display mechanism such as a projector might not be considered a monitor in a literal sense).

When a monitor is plugged into a computer system, a transient monitor manager component in software is notified and attempts to identify the monitor to see if it was previously configured on the computer system. Persisted monitor configurations are searched for one containing an identifier of the just-connected monitor, which may be maintained in combination with a respective identifier for each other connected monitor. If monitor configuration data was previously established, the established video mode of the just-connected monitor can be obtained, as well as that of any other connected monitor or monitors, to obtain their video modes. If not an exact match, data may be obtained from similar configurations that were previously established. When a change is needed, the video modes for all of the monitors may be applied at one time so only one 'flash' or refresh is needed, and without user interaction. A monitor configuration may be found in which the video modes of any already plugged-in monitors need not change.

In one implementation, the present invention operates on connection or disconnection of a monitor, such as indicated by receipt of a plug and play event provided by the video stack in the operating system. The present invention also operates when the user logs in, when the user locks and then unlocks the computer, or when a fast user switch occurs, to handle situations in which monitor changes occur while the user is logged out.

The transient monitor manager component configures one or more monitors on arrival, which may be into a known configuration when such a known configuration has been previously established, or if not previously established, into a most likely desirable configuration (to the extent possible). More particularly, if a matching configuration is not found, a new configuration is determined based on the capability of each monitor that is connected and the video capabilities of the system, although other factors such as power and type of operation (e.g., media playback versus image viewing) may modify a given monitor configuration.

In one implementation, if a monitor has not been connected to a computer system before, then the monitor is queried for its possible video modes. If the monitor responds, the returned information is used to determine the best possible settings for that monitor relative to the current video card's capabilities, and the video modes may be applied without user interaction, although providing some user interface to the user is alternatively feasible, such as the first time a particular monitor is encountered. If the monitor does not have video mode information, then a standard (e.g., minimum) video mode configuration may be used. In most instances, user confirmation as to whether the monitor configuration is correct is only needed when the system cannot find a monitor configuration and the monitor does not provide video mode information.

Further enhancements to search for a best-guess monitor configuration can be made to find a likely-best monitor configuration. These enhancements may include using existing settings in scenarios where the monitors that are currently plugged-in have been seen before, but not in the same monitor configuration.

In addition to intelligently configuring newly-connected monitors, upon disconnection, the manager component may reconfigure any surviving (still-connected) monitor or monitors to adjust for the configuration change. This may include changing settings, and may also include shuffling windows and other images that appeared on the disconnected monitor over to the surviving monitor or monitors. The manager component tracks any manual changes that the user makes to the configuration (e.g., one or more of the settings) and automatically restores the configuration when the same monitor or a monitor of a similar type is encountered.

Moreover, because the present invention is responsible for setting the video modes when the monitor configuration changes, the present invention is extensible to handle the video mode changes needed to conserve power on computers where power conservation is important, such as when dealing with mobile devices that may experience low battery conditions. The transient monitor manager can be notified of power scheme changes and can act to apply uniform power policy rules. This feature provides additional benefits in that at present, contemporary display device drivers for mobile devices are not multi-monitor aware, and hence a mobile device will often make power-related video mode changes only for its internal monitor.

Other advantages will become apparent from the following detailed description when taken in conjunction with the drawings, in which:

DETAILED DESCRIPTION

Exemplary Operating Environment

Figure 1:
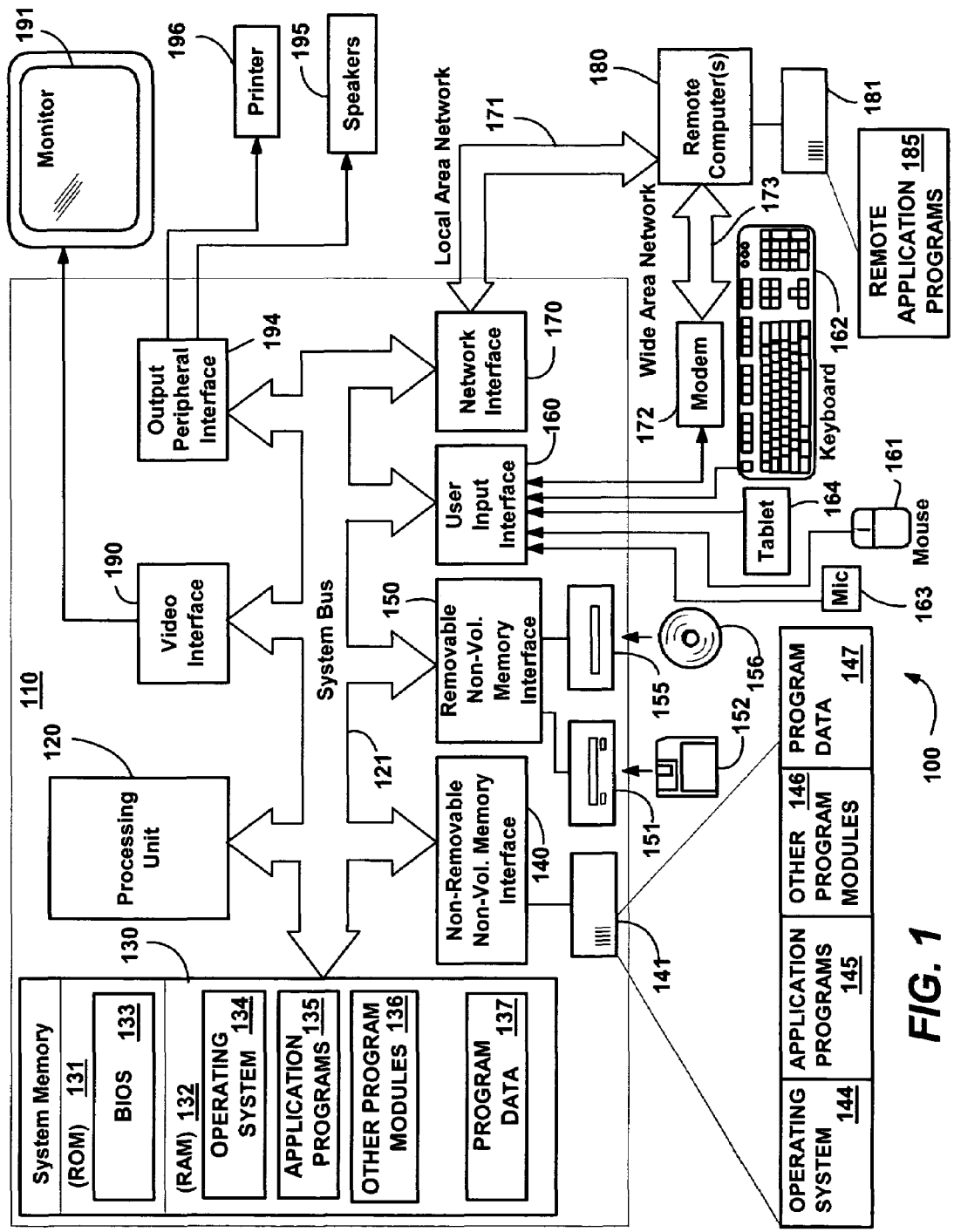
FIG. 1 is a block diagram representing a general purpose computing device in the form of a personal computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Note that as described below, the present invention is generally directed towards data sources, which may, for example, include data sources corresponding to a SQL server and/or XML data provider (web service), that reside on one or multiple remote systems. The computing environment 100 of FIG. 1 is understood to include any local and/or remote source of data, including the SQL server-provided data, web service server provided data, and others.

Managing Monitor Configurations

The present invention is generally directed towards a system and method by which any change to the way in which one or more monitors are configured is detected at a manager component, which may then automatically apply computer-managed monitor configuration data to compensate for the change, in a way that most users would likely prefer. As will be understood, numerous ways to implement the present invention are feasible, and only some of the alternatives are described herein. For example, the present invention is described with reference to a computer system into which one or more video cards may be installed, and in which connections and disconnections of monitors to and from the computer system are detected by an operating system component, such as a component based on plug and play (PNP) technology. However, the present invention may instead be implemented on other types of devices, such as media players which connect to a television set. Indeed, any display mechanism, such as a computer monitor, television set, projector device, and so on that may communicate some data or identifier corresponding to its capabilities to another device, may benefit from the present invention. As such, the present invention is not limited to any particular examples used herein, but rather may be used in various ways that provide benefits and advantages in computing in general.

Moreover, certain examples of the present invention are described with various references to computer monitors having identifiers, particularly an "Extended Display Identification Data" or EDID, as defined by the Video Electronics Standards Association. In general, an EDID is a data structure by which a computer monitor is capable of informing its connected host computer system of its identity and capabilities (an extended EDID data structure, referred to as E-EDID, is a later version of such an identifier). However, the present invention is not limited to monitors that have EDIDs, but rather will work with any identification system. Thus, as used herein, the term "identifier" and its variants includes any way for a display mechanism to identify itself and/or its capabilities to a connected host system, including data structures based on the EDID and E-EDID standards.

Further, note that as used herein, the terms "connected," "coupled," "plugged-in," and their variants are equivalent and generally denote a state in which data may be communicated in at least one direction between a monitor and computer system, independent of whether data is communicated over a wired or wireless medium. The opposite state, in which data cannot be communicated for whatever reason, including removal of a physical communication medium, a wireless out-of-range or interference condition, a power-off state of the monitor or video head (including a powered-off internal monitor such as with a laptop), and so forth is equivalently referred to as being "disconnected," "decoupled" or "unplugged," along with their respective variants.

Figure 2:
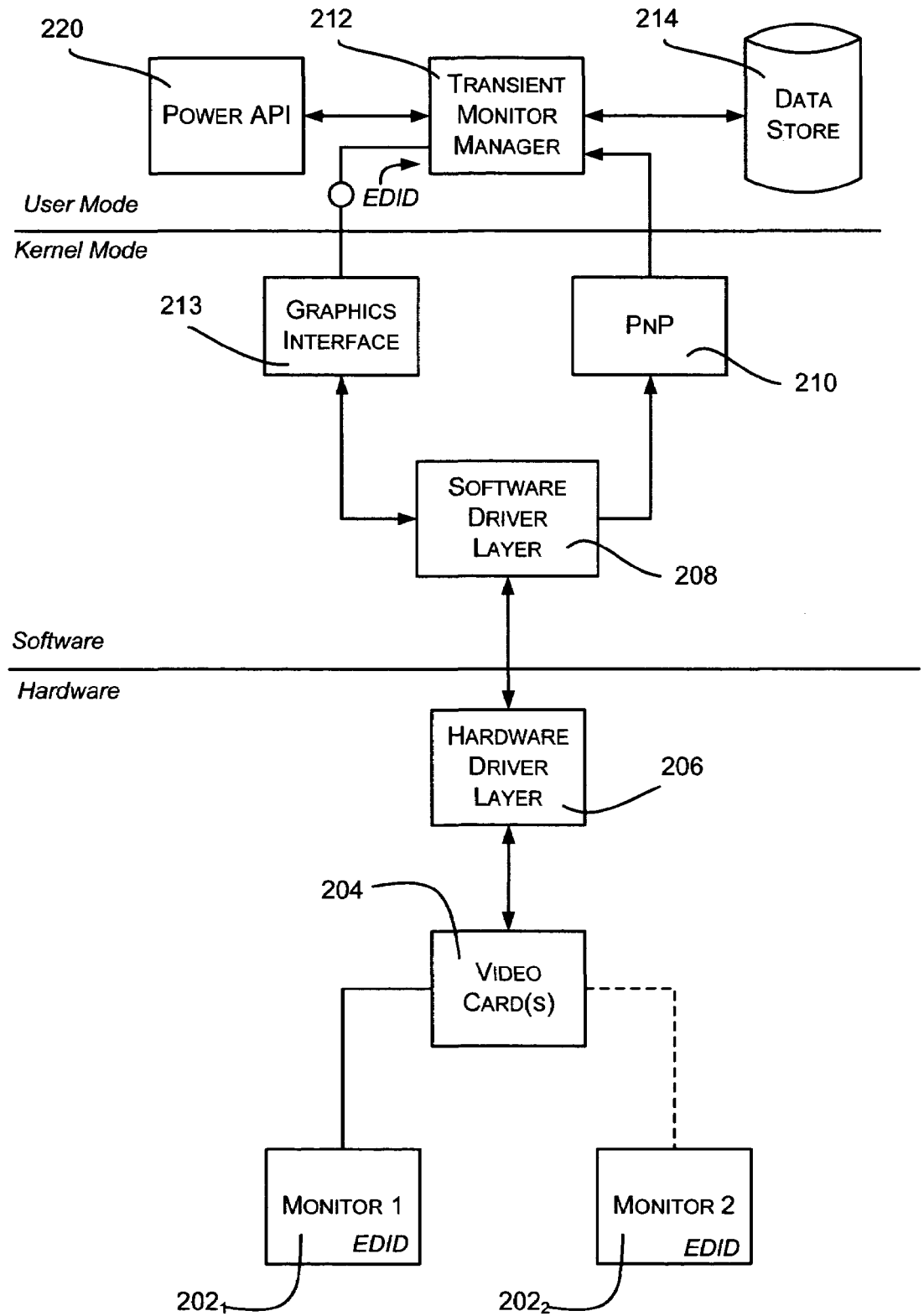
FIG. 2 is a block diagram generally representing components for managing one or more monitors, including applying monitor configuration data based on current set of monitors, in accordance with various aspects of the present invention.

Turning to the drawings, FIG. 2 shows an arrangement of example components in which the present invention may be implemented. In FIG. 2, a display mechanism comprising one or more monitors $202_1$, and $202_2$ may be connected to and disconnected from one or more video cards (video adapters) 204, such as by physically plugging in a monitor via a video cable. Although only two monitors are shown in FIG. 2, it is understood that any practical number of monitors may be connected. Note that contemporary computer systems support multiple video cards, such as AGP or PCI-based video cards, and also that single video cards having multiple video heads are commercially available. Also note that although not specifically represented in FIG. 2, the concept of a video "card" is equivalent to built-in video circuitry that may not be actually on a removable card.

Whenever a display mechanism such as the monitor $202_2$ is connected or disconnected while the computer system is operational, a signal is sent from the video card 204 through the video stack (e.g., hardware and software driver layers 206, 208 or the like) to an operating system mechanism that is configured to sense hardware changes, as represented in FIG. 2 by a plug-and-play (PNP) component 210. The plug-and-play component 210 sends an event through the system to appropriate entities, whereby a user-mode component referred to as a transient monitor manager 212 knows of the connection or disconnection event. Note that this arrangement leverages current technology; in alternative configurations, a transient monitor manager may be implemented as a kernel component, and/or may be configured to sense monitor connections and disconnections without the plug-and-play component 210.

In keeping with the present invention, the transient monitor manager 212 is capable of finding out information about connected monitors, such as by making queries, e.g., via API calls through a graphics interface (e.g., GDI-based software) 213. A first such query may be directed towards obtaining the monitor's associated identifier (e.g., EDID), provided the monitor supports this standard; partial EDIDs are used to the extent possible, while NULL EDIDs are handled by setting the display mechanism to some minimum and obtaining user confirmation. More particularly, because in practice not all monitors have a unique serial number, when a new monitor is plugged in, a configuration of similar monitors may be used. The system may check the manufacture code and the product identifier of the monitor and see if the combination was seen before. If there was a match for these two pieces of information, then the serial number can be used to further identify the monitor. If the serial number is not unique then other information from the monitor (e.g. from an EDID data structure) can be used to identify the monitor.

The serial number is not necessarily the best means of identifying a monitor. Another way to identify a monitor is to convert the entire EDID or parts of the EDID into a hash code, and store the EDID into a hash table. Since the make and model of the monitor is part of the EDID, an entry point into the hash table for the EDID comprises a hash table for the make and model information. This eliminates the need to query the monitor again for more information (as described below). Using the EDID as an identifier may thus be preferable because some monitors may not have a serial number, or a unique serial number for the monitor make and model. To help further identify a monitor, a network to which the computer is connected may be identified, and the information folded into the hash code used for the EDID.

If the monitor does not have an EDID (or has a NULL EDID), then various other identification mechanisms can be attended. For example, if it can be established that the monitor is an internal monitor (e.g., a built-in LCD panel of a laptop), then this may be one form of identification used to differentiate monitors. If there is no other way to differentiate a monitor and it has a NULL EDID, the algorithm (generally described below) can specify a special monitor identifier. However if there is more than one NULL EDID monitor, there is no way to save different monitor settings for the two monitors. In this case the two monitors will share the same video settings, or the algorithm will consider the monitors as new monitors.

As described below, to determine a current monitor configuration, the identifier of the just-connected monitor (when available) is used in conjunction with the one or more identifiers of one or more other monitors already known to be connected. Note that when needed, the transient monitor manager 212 is capable of querying all connected monitors (those that are capable of responding) to figure out a current set of one or more that are connected. For example, this is needed following startup, when any number of changes to the last monitor configuration may have been made during shutdown (or hibernate or the like) without a corresponding sensed PnP event. Similarly, on a disconnect event that does not identify which monitor was disconnected, the transient monitor manager 212 may query for any surviving monitors, to determine by process of elimination which monitor was disconnected.

In accordance with an aspect of the present invention, once the transient monitor manager 212 knows the set of one or more monitors that is currently connected, the transient monitor manager 212 determines a monitor configuration (a set of data) to apply to the set, and applies it, possibly without any user confirmation required. As described below, determining the monitor configuration may depend on whether a monitor configuration was previously established for this set, or whether the set corresponds to a new monitor configuration, in which event the transient monitor manager 212 essentially constructs a new monitor configuration for this set in an intelligent manner and then applies that constructed monitor configuration.

To determine whether a corresponding monitor configuration has been previously established, the transient monitor manager 212 accesses monitor configuration data maintained in a data store 214. In general, if a matching monitor configuration is found, it is applied, whereby the newly connected monitor and any other connected monitors are automatically changed as necessary to restore a prior video state to each monitor. Video state refers to any video-related value capable of being set by software, (e.g., resolution, refresh rate, color depth, orientation, brightness, contrast, video head state on or off, and/or DPI of the monitor). For configurations with multiple monitors, video state also includes the relative logical position (on the corresponding computer desktop) of the monitors with respect to one another, referred to as geometry. Note that the concept of a monitor configuration thus includes the video settings/modes for a set of one or more monitors, along with geometry, and other information that affect video settings/modes, (e.g. a power scheme). As can be readily appreciated, not all of the possible information needs to be known to persist and apply a monitor configuration, however, the more configuration information that is available and persisted, the next time that the same set is reconnected, the better the transient monitor manager 212 can restore the system to its prior state.

Also shown in a power API 220 by which the transient monitor manager 212 can modify, at least temporarily, the settings that are applied to the monitor set. It can be readily appreciated that power-related events, such as low battery condition, or a mobile device being reconnected to a power source, may be detected at the transient monitor manager 212, and thereby used as a basis for changing the video settings.

Figure 3:
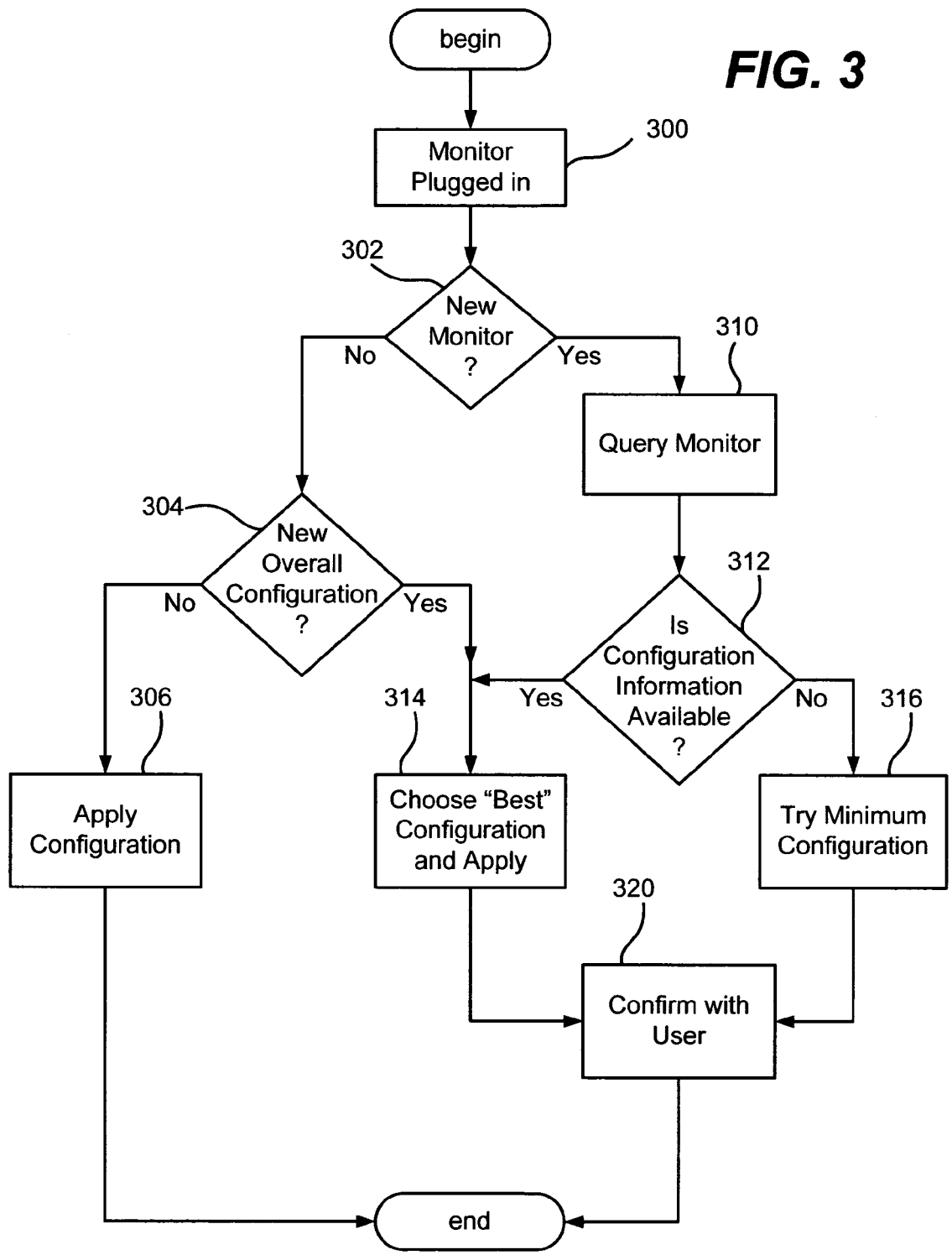
FIG. 3 is a flow diagram generally representing example steps taken by a transient monitor manager component upon connection of a monitor to a computer system, in accordance with various aspects of the present invention.

FIG. 3 is a flow diagram summarizing various operations performed by the transient monitor manager 212 when a monitor is detected as having been plugged in, e.g., via a plug-and-play event, as represented via step 300. Step 302 represents a determination as to whether this is a new monitor or one that has been encountered before by this computer system. This step implicitly includes evaluating an identifier associated with the monitor, which may be considered as being obtained via a subsequent query-type of operation to obtain the identifier, although it is feasible for an identifier to be provided in conjunction with the connection event. Various ways to determine whether the monitor has been previously connected are described below, although in general, if the monitor has been previously connected, then the monitor corresponds to at least one monitor configuration having data persisted in the data store 214. Note that a utility program or the like may be used to clean out no-longer-needed monitor configurations from the data store 214, but for purposes of the present example description, it is assumed that any previous monitor configurations remain stored in the data store 214.

If the monitor corresponds to at least one monitor configuration, and thus is not new to this computer system, step 302 branches to step 304 where the overall configuration (including any other connected monitors) is evaluated, looking for an exact match against any monitor configuration that contains data corresponding to the just-connected monitor's identifier. In general, the transient monitor manager 212 looks for an identical configuration to one that the user previously had. If one is found at step 304, the monitor configuration is used at step 306 to reset the set of (one or more) monitors to its previous configuration, and this process of the transient monitor manager 212 ends until again needed. Note that it is feasible to require something looser than an exact match at steps 302 and/or 304, such as when the just-connected monitor is sufficiently similar (e.g., same make and model) to another monitor to be considered a match. As can be readily appreciated, the applying of an existing monitor configuration will be a reasonably frequent occurrence for many types of users, including users that move mobile devices between locations and plug into monitors at each, users who share the same computer but have different settings (the monitor configurations are persisted per-user), and so forth.

At step 304, although the monitor was recognized at step 302, it is possible that the overall configuration is new. For example, the just-connected monitor may have created a combination of monitors that has never been used before, or the just-connected may have always been used in a combination, but now is connected by itself. If the overall configuration is new, step 304 branches to step 314 where a "best" configuration for this new monitor is automatically chosen by the transient monitor manager 212; (note that "best" is in quotation marks to indicate that this is not necessarily what is best, but only a best guess as to what most users would likely find desirable). For example, the settings from a non-matching monitor configuration in which this monitor was most recently used may be chosen and applied as the best guess. Note that before applying the configuration, the settings need to be evaluated for compatibility with the video card, which may not be the same card to which the monitor last connected. If not compatible, a less-recently used configuration may be chosen, and/or the settings changed to the closest values that are compatible with the video card.

Step 314 branches to (optional) step 320 to confirm via a user interface dialog or the like that the applied configuration is acceptable to the user, with the user interface typically providing a link to modify the monitor configuration (e.g., display properties) if the user prefers to change them. Following the user interaction at step 320, (which the user may elect to bypass in the future), this process of the transient monitor manager 212 ends, until again needed on a connection event.

Note that on user interaction, additional information may be obtained. For example, the user may be asked if he or she is giving a presentation. If so, other types of changes may be made, e.g., the monitor configuration may be set for no screen blanking/no screensaver, notifications may be turned off, and so forth.

Returning to step 302, if the monitor is new to (e.g., not found in an existing monitor configuration of) the computer system, step 302 instead branches to step 304 which represents querying the monitor for its capabilities, that is, any configuration-related information that the monitor can provide. For example, some contemporary monitors are able to provide information such as their screen dimensions, from which a DPI can be determined, along with other information such as a preferred operating resolution, refresh rate, color depth, and or other settings. Note that some or all of this information may be in the identifier that was previously evaluated at step 302; if so, there is no reason to query for it again at step 310. However, as described below, an API or the like may be provided in which selective parts of the EDID may be retrieved, e.g., the serial number in one call, the capabilities in another call, and thus multiple queries may be made.

Alternatively, if at step 312 detailed information is not available, but enough other information is available and indicates that the just-connected monitor is very similar (e.g., same make and model) to another monitor known to the system, the configuration information of the other monitor may be substituted for this monitor's configuration information. As represented in FIG. 3, step 312 branches to step 314 when sufficient information is available, and this information is used to select and apply a best-guess configuration for the just-connected monitor. Note that the monitor-provided (or substituted similar) information may need to be modified as a result of limitations of the video card, which may be accomplished via iteration as described below.

If at step 312 the monitor was not able to provide sufficient information, step 316 is instead executed to attempt some minimum configuration. For example, a vast majority of personal computers and monitors support at least the VGA standard, allowing a user to view meaningful graphics including a user interface that is sufficient to manually change the video settings. Step 320 follows the configuration attempt, allowing the user to make such changes and/or confirm that the configuration is acceptable. Note that although not shown in FIG. 3, it is feasible for step 316 to start with something better (e.g., having more resolution) than VGA, and then time out at step 320 if the user takes no action, followed by a return to step 316 where something lesser can be tried. In other words, the process may advance from step 316 to step 320, and, after some time to allow interaction, loop back to step 316, retreating in resolution towards a minimum until either the user interacts at step 320 or the minimum (such as VGA) is reached. Once the user confirms at step 320, the process ends.

If the user never confirms, it may be assumed that the monitor is not working properly or is not at least VGA-capable, in which event the computer system can take other actions such as to notify the user on another monitor of the problem, and/or not include this monitor as part of the current configuration, as if it was never connected.

Thus, when a monitor is plugged in, a monitor configuration needs to be found or configured so that changes to the video settings may be applied. A rapid way to do this is to look up past monitor configurations, based on the monitors that were part of the configuration. A first search is thus made to quickly identify whether a newly connected monitor has previously been part of a monitor configuration. The identity of a monitor may be determined by a serial number contained within the EDID, which is a 32-bit number in present versions. In the event there is not a serial number, one or more various other (e.g., EDID) fields may be hashed to provide a value that is useful for identification purposes, as described above. An instrumentation API call or the like (e.g., via the graphics interface component 213) may be used to retrieve the EDID.

In example implementations, various ways to expedite the lookup include using hash tables and/or arranging the known monitor identifiers in a balanced binary tree, e.g., the known monitor information may be contained in an array and each node in the binary tree may be an index into the array of monitors, such that each entry in the array of monitors contains a list of pointers, each of which point to each monitor configuration of which the monitor was a part. In general, a binary tree will be used hereinafter to illustrate one possible implementation. In such an implementation, the monitor configurations are stored in a list of most recently used monitor configurations, referred to as a monitor configuration list, with a linked list of pointers to the monitor configuration list contained in an element of the array of monitors and sorted such that the pointers at the head of the list point to the most recent monitor configuration of which that monitor was a part.

Because monitor configurations may change from one user to the next, if the transient monitor manager 212 is a kernel component, the link between the array of monitors and the monitor configuration list is reset when there is a user context change. Each node in the monitor configuration list may contain data such as a time stamp (for arranging in most recently used order), the number of monitors in the configuration, the power scheme (e.g., represented as a GUID), a version number (for possible future versions of the data structure), the video port state (i.e., whether a video port is active or deactivated), the geometry of the monitors and a monitor/state array identifying the monitors in this configuration and their respective states. Alternatively the video settings may be extracted from the monitor state information.

The monitor/state array has elements containing the index entry that corresponds to the monitor within the array of monitors and a structure containing the state of the monitor. The state contains information such as the resolution, refresh rate, color depth and the orientation of the monitor. There are cases where a video head state needs to be tracked independently of the presence of a monitor. In this case the video head state will be stored instead in the monitor configuration list entry node instead of the monitor state.

When the machine starts up with known monitors, the monitor identities are obtained. For example monitor A, monitor B and monitor C, may be in a configuration, with such as monitor A having an ID of 5, monitor B having an ID of 3 and monitor C having an ID of 7. The binary tree is checked, and in this example where these are known monitors, nodes corresponding to IDs 5, 3 and 7 are found. Each node contains the index into the array of monitors. The list of pointers to the monitor configuration list contained in each array element is filtered down to just those corresponding to the number of monitors (three) and the power scheme currently in use. Next a comparison is performed on the pointers to the monitor configuration list of each monitor to see if there is a match. If there is a match with the three monitors, then the video settings obtained from the monitor configuration list monitor states and the geometry obtained from the monitor configuration list node is applied (via the graphics interface 213). In the event that the geometry of any monitor does not match the stored geometry, the stored geometry is not used. As an example, consider monitor B being moved to the left side of monitor A, before monitor C is plugged in. In this situation, it is known that monitor B has moved to the left of monitor A, and thus the geometry stored for monitors A, B and C (when plugged in) is not used because the stored geometry shows monitor B to the right of monitor A.

In the event that an unknown monitor is plugged in, although a video mode could be determined by iterating the possible modes, in order to possibly restore past settings, a search for the monitor model number is performed, in an attempt to provide the user with a mode used in the past for a similar monitor. If the search on model number fails, monitor capabilities may be used instead, wherein the monitor capabilities include a combination of screen size and/or modes and refresh rates that the monitor supports. Information such as the type of monitor, e.g., LCD, CRT, plasma or some other type may enhance the selection of a desirable mode. An example is when a user moves from one conference room to another, and plugs the same computer into a meeting room monitor that is not identical, but is similar. In such a situation, the monitor ID may not be found in the array of monitors using the binary tree of monitor IDs. When the search fails, a search will be performed on the display mechanism's model number.

Two ways to search on model number include creating another binary tree that can be searched on the model number, or performing a linear search through the array of monitors. Because for most users the number of times an unknown monitor is added is likely relatively rare compared to the number of times that known monitors are plugged and unplugged from the computer, and because creating a binary tree will require a linear search through the array of monitors, a simple linear search may be advantageous.

Another scenario where an unknown monitor may be plugged in includes when unknown monitors are the only monitors plugged in, such as with a mobile computing device that does not have an internal monitor. If the computer is already running, the transient monitor manager 212 is notified of one or more new monitors being plugged in. Alternatively, if the computer is first starting up, the transient monitor manager 212 first checks to see what monitors are plugged in to the computer. In either case, the monitor ID of each new monitor is obtained, and in this "unknown monitor" example, a check of the binary tree shows that there is not any known monitor with this monitor ID. The model number is then obtained, and used to search the array of monitors (e.g., linearly) for each case of the model number. Each time there is a match, the array index is added to a linked list.

If there is only one linked list, the linked list is checked linearly and the array index is used to get access to the pointers to the monitor configuration list. When the monitor configuration list entries are filtered for one monitor and the newest entry is found, the associated video settings data are used to set the monitor configuration, and the monitor configuration list is updated. If there are no matches then the video modes are iterated and the monitor configuration determined by an optimum resolution and refresh rate.

If there is another monitor added during this process, another linked list is created and populated in the same manner. The linked lists are searched and any monitor configuration list entries are filtered for two (or more) monitors. The newest monitor configuration list entry that is shared by all of the linked lists is used.

Monitor plug/unplug events are checked after each linked list is populated, and again just before applying the video settings data. If there is a change, then a new monitor configuration is determined. In the event that one or more known monitors are already plugged in when the unknown monitor is plugged in, a situation similar to an only unknown monitors condition exists, except that the monitor configuration list entries are compared with those pointed at by the known monitors array entry.

To update the array of monitors with the newly identified monitor, when an unknown monitor is queried, it is appended to the end of the array of monitors. At this time the array entry does not have any pointers to the monitor configuration list. The binary tree is then updated with the new monitor ID. Once the monitor is added to the monitor configuration list, the array of monitors is updated when the code that updates the video settings calls the code that maintains the array of monitors with a method that takes a pointer to the monitor configuration list entry and the set of monitor IDs and passes back the associated array index for each monitor. The function adds the pointer to the monitor configuration list entry to each array entry associated with each monitor in the set of monitors passed in as a parameter.

Figure 4:
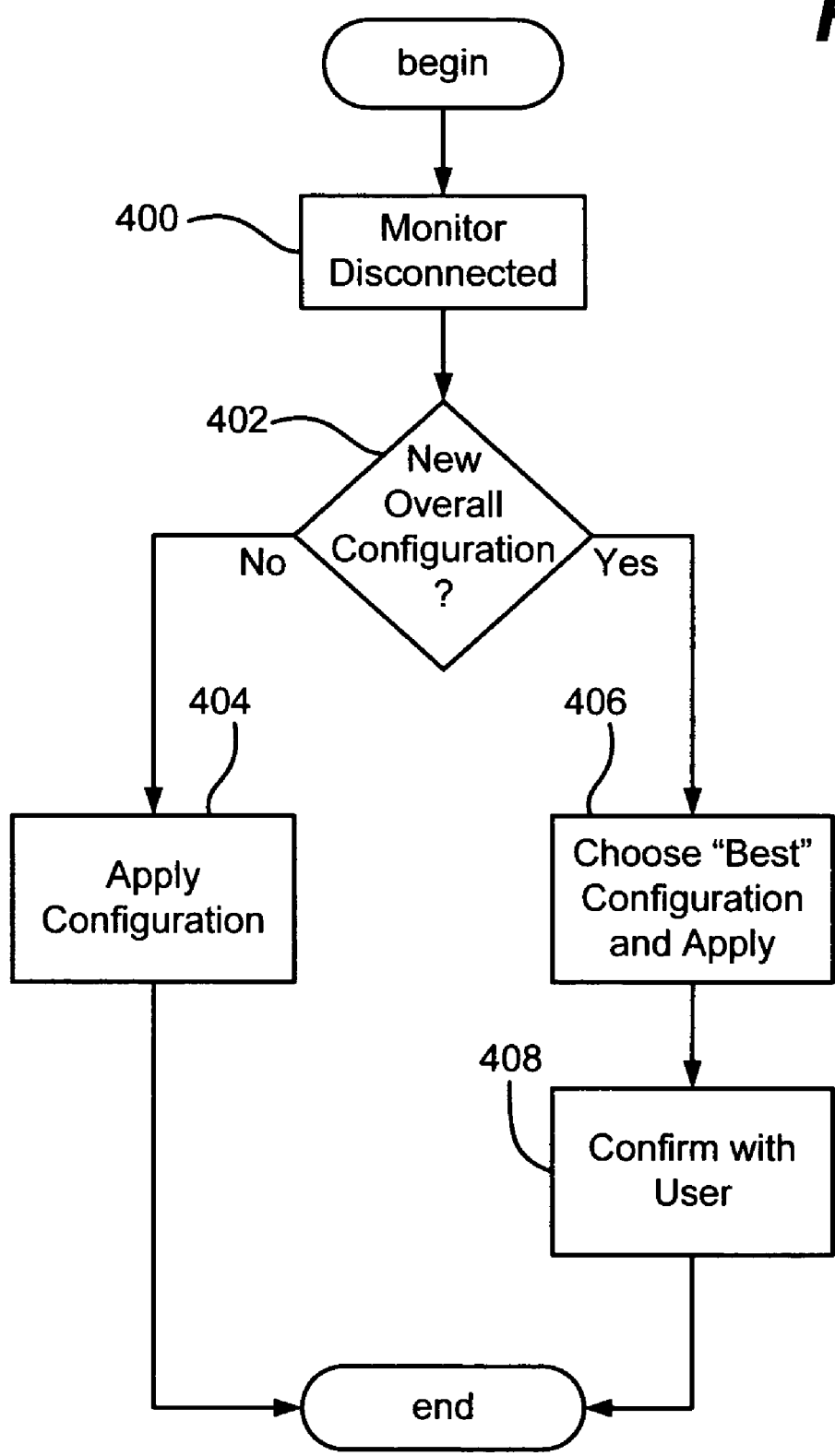
FIG. 4 is a flow diagram generally representing example steps taken by the transient monitor manager upon disconnection of a monitor from a computer system, in accordance with various aspects of the present invention.

Turning to consideration of a disconnect operation, FIG. 4 shows example logic taken by the transient monitor manager 212 in response to a disconnect event, as represented by step 400. Note that as described below, it is generally not desirable to simply take no action, because other program windows, icons and so forth being displayed on the disconnected monitor would no longer be visible. Thus, step 402 evaluates the overall configuration that results from the monitor being disconnected. As mentioned above, this implicitly requires knowing which monitor was disconnected and which one or more remain connected, which may require querying the surviving monitor or monitors for their identifiers and determining by process of elimination which monitor was disconnected.

In general, given the modified monitor set, the transient monitor manager 212 looks for an identical (or sufficiently similar) configuration to one that the user previously had. If one is found at step 402, the monitor configuration is applied at step 406 to reset the surviving set of (one or more) monitors to its previous configuration, and this disconnection-handling process of the transient monitor manager 212 ends until again needed.

If instead at step 402 the monitor set is deemed new, step 402 branches to step 406 wherein a best-guess configuration is chosen, as generally described above, e.g., based on similar configuration data or based on the capabilities of each monitor that remains connected. Step 408 allows the user to confirm, which typically also facilitates any user changes.

By way of example of when a known monitor is unplugged, consider another configuration of a computer having monitors A, B and C connected. While the computer is running, monitor C is unplugged, whereby the transient monitor manager 212 receives a PnP notification that a monitor has been unplugged, and, if the monitor that was unplugged was not identified, the transient monitor manager 212 determines which monitor was unplugged by the process of elimination, that is, by re-obtaining the monitor IDs of those that remain connected and by comparing the IDs to the monitor configuration list.

As described above with reference to FIG. 4, in one implementation this can result in a monitor configuration change to restore monitors A and B to prior states. Alternatively, in one alternative implementation (which may be user configurable), in order to avoid confusing the user, the states of the remaining monitors may be left intact, e.g., neither the resolution nor the refresh rate of monitor A or B will be changed. However the video head of monitor C will be turned off, and a new entry in the monitor configuration list prepared by taking a copy of the current monitor configuration and eliminating monitor C from the list of monitors. The video settings are serialized and stored at a storage location accessible by a new GUID, which replaces the GUID of the old monitor configuration, and the timestamp is updated. The geometry of the remaining monitors is recorded and the data placed at a storage location addressable by the timestamp. Then the new monitor configuration is placed at the head of the monitor configuration list.

In the event that monitor C is plugged in again, the transient monitor manager 212 will receive a PnP notification that a monitor has been plugged in. After obtaining the serial number of the monitor, it is determined via the binary tree of monitor IDs that monitor C has been plugged in. As is understood, the appropriate video settings to use are then determined as described above, because this is a "known monitors" situation.

It is also possible that there is a monitor reconfiguration during power down, using known monitors. Although somewhat similar to receiving an unplug event, no PnP notification is received. Consider again an example of a computer connected to monitors A, B and C, in which the user powers down the computer and unplugs monitor C. In this example, the computer has not previously encountered a configuration with just monitors A and B. On power up, monitors A and B are plugged in and accordingly identified, however there is no entry in the monitor configuration list with two monitors that include monitors A and B.

One first optional way to determine how to set up the two monitors is to determine the optimum resolution and refresh rate by iterating over the possible modes that the two monitors can support. A second way is to modify the search rules on the monitor configuration list so as to not require that the number of monitors equal three to match an existing configuration, whereby that the transient monitor manager 212 will find monitor configurations that include monitors A and B. In this manner, a new monitor configuration may be found, similar to as if monitor C was unplugged while the computer system was powered up. Note that if this second option is used, only the most recent configuration that included monitor A and B is used. To the user the only change is that monitor C is missing, as the monitor settings for monitors A and B remain the same as they were when monitor C was plugged in. Of course it is possible that monitors A and B where plugged in with yet another monitor, but it is typically desirable that the monitor settings of monitors A and B remain the same. The video settings are set and the video head for the third monitor is turned off. The monitor configuration is then recorded and the monitor configuration list updated. In the event that the attempt to set the video settings fails, then the first option may be used.

In accordance with another aspect of the present invention, when a monitor is disconnected, any program windows, icons and so forth that were being displayed on that monitor may be switched to the set of one or more surviving monitors by the transient monitor manager 212. To this end, upon detection of the disconnection and any reconfiguration of the surviving monitor or monitors, the data regarding the window positions, sizes and so forth still exists in memory and is used to "shuffle" the information from the now non-extended or lesser-extended desktop to the desktop area that remains. The windows and other images may be scaled as necessary to fit the new area. Program windows from the disconnected monitor may be moved to the new area, or they may be minimized in the taskbar or the like of a connected monitor until selected, at which time they will be restored on a connected monitor.

In the event that the disconnected monitor (or similar monitor) is reconnected, the windows and other images may be restored. However, to avoid user confusion, there may be rules applied to handling the windows, e.g., rather than simply restore to where a window was, a window may remain in its current position if the user interacted with it in some sufficient way, e.g., typed or clicked on it, moved it, resized it, and/or gave that window focus.

Note that with a "fast user switch" a user does not log out and thus positioning data about the user's windows are maintained. Thus, the data for multiple users may be reshuffled as necessary following a disconnect and/or reconnect configuration change even when the computer was switched to another user at the time of the event. A hibernate followed by a configuration change can likewise result in shuffling of windows and the like, although the transient monitor manager 212 needs to be notified upon coming out of hibernation mode so that the current monitor configuration can be determined.

Figure 5:
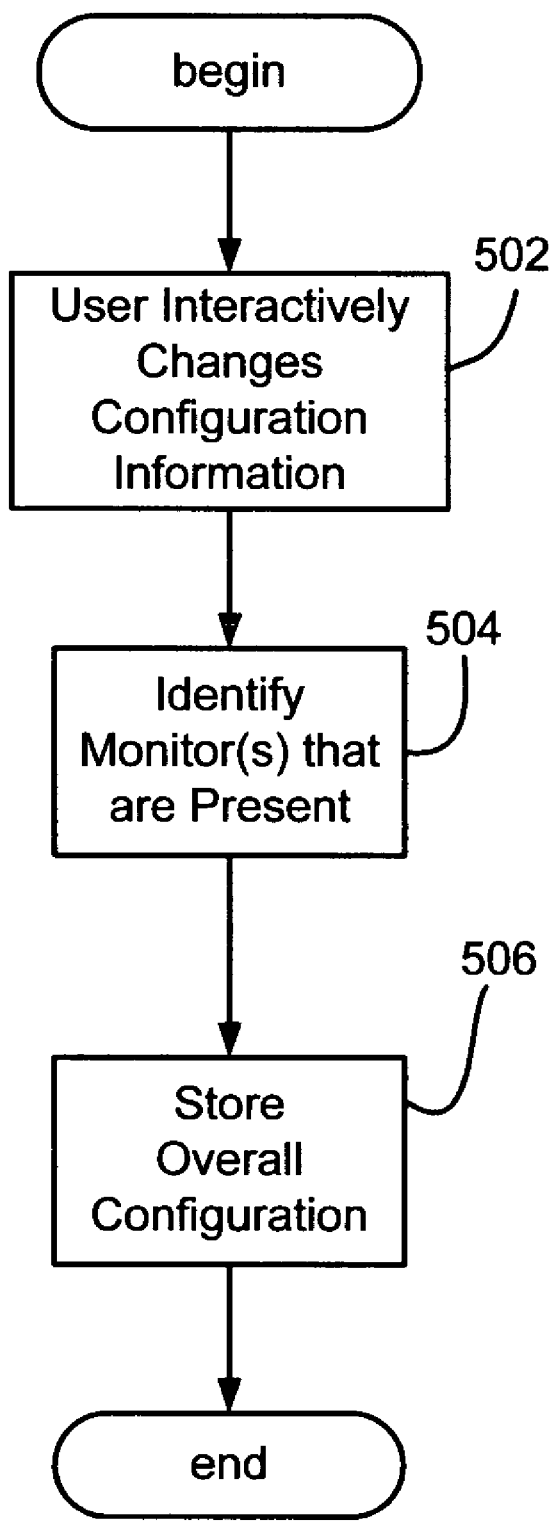
FIG. 5 is a flow diagram generally representing example steps taken by the transient monitor manager when a user interactively changes monitor configuration data, in accordance with various aspects of the present invention.

Turning to FIG. 5, as apparent from FIGS. 3 and 4, in certain circumstances, the selections of the transient monitor manager 212 may be overridden by manual user interaction with an appropriate user interface, e.g., a "display properties"/control panel user interface. The user may change the configuration data at other times as well, such as during normal operation. As can be appreciated, these changes need to be persisted in the monitor configuration data for the current monitor set, otherwise they would be lost upon the next configuration change resulting from a connection or disconnection.

FIG. 5 represents the actions taken by the transient monitor manager 212 upon user interaction that changes a configuration, as represented by step 500. For example, the user can select the "display properties" user interface, and once any changes are applied, the transient monitor manager makes the changes to the monitor set, and also persists the changes. To persist the changes, at step 502, the configuration-update process identifies the set of (one or more) monitors that are presently connected. Among other things, this may be used if the change is to the configuration (e.g., the user wants a monitor removed), or to locate the corresponding configuration data in the data store 214 (FIG. 2), which is the most recently used configuration. The overall configuration including any changes made by the user is then stored at step 506.

As mentioned above, there are a number of factors other than the set of one or more monitors that can determine a monitor configuration. One of these factors is power state, which can change or override the settings that normally would be applied. For example, refresh rate, color depth, resolution, backlight brightness, contrast and so forth all can be modified to preserve power. Indeed, the internal monitor of a laptop can be automatically turned off when, for example, the laptop is running low on battery power but the monitor configuration is such that a fully-powered monitor is connected.

Another way to automatically modify a monitor configuration is via a temporary mode. For example, video playback is known to operate well with a 60-hertz refresh rate. Detection of such playback, versus presenting graphics for example, may be used to change the mode until the conditions change.

Monitor manufacturers can also have custom settings that are persisted/restored by calls to the transient monitor manager 212 or the like. For example, a television-based monitor may request that certain areas be cropped on the screen at certain times, with those areas restored without user interaction in other conditions. Also, custom settings such as color space correction/gamma may be saved in conjunction with a monitor configuration.

EXAMPLE LOGIC

Figure 6:
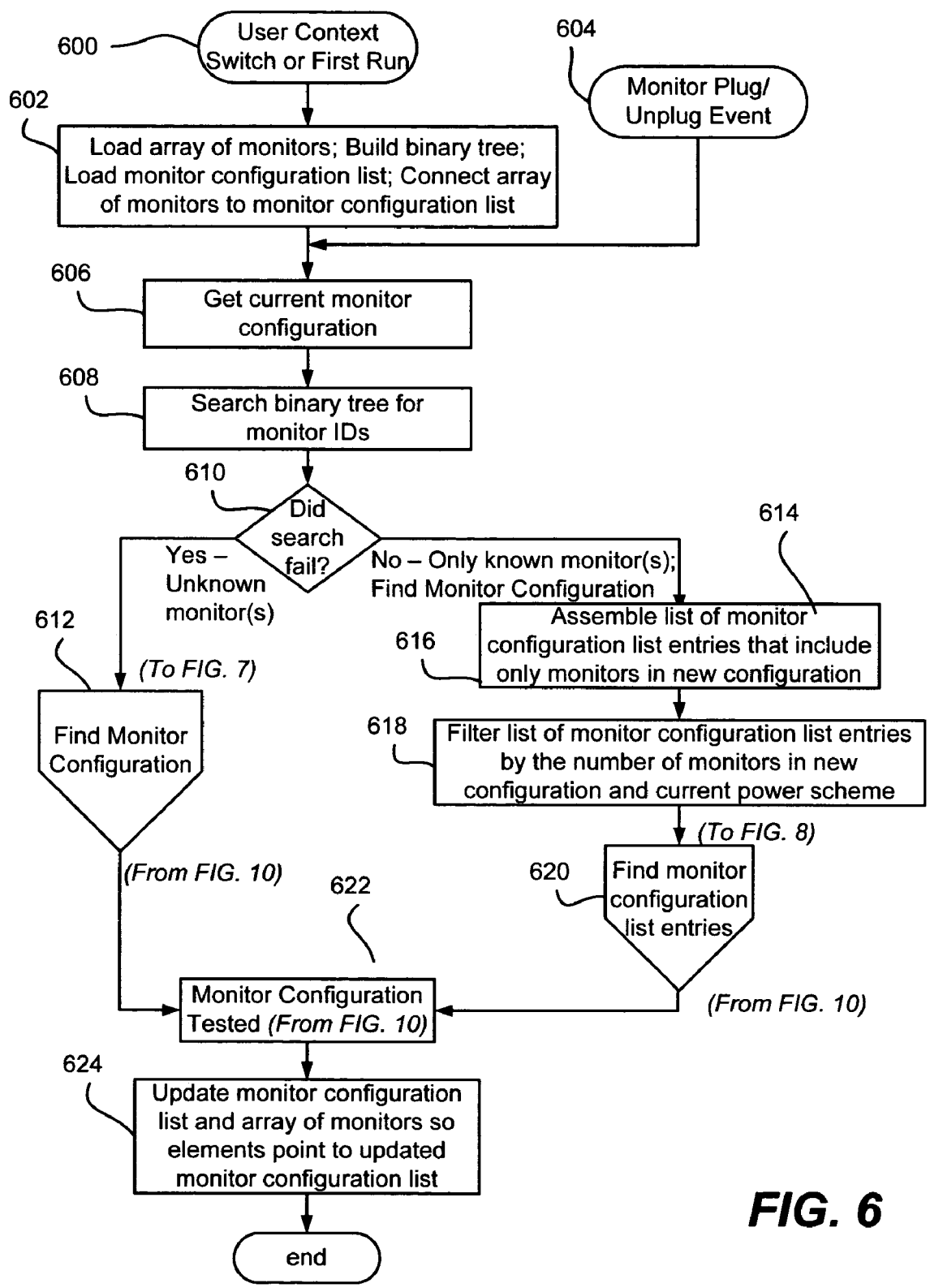
FIGS. 6-10 comprise a flow diagram generally representing steps taken by a transient monitor manager to handle various scenarios, in accordance with various aspects of the present invention.

FIG. 6 shows an overview of the transient monitor manager 212 in one particular example implementation. As represented in FIG. 6, in general there are two entry points into the transient monitor manager 212, including one at step 600 when the transient monitor manager 212 starts or when a user context switch occurs. If the transient monitor manager 212 is started up or there is a user context switch, the appropriate user data has to be loaded. To this end, as represented by step 604, the monitor configuration list and the array of monitors are loaded from memory and the binary search tree is built; connections are established between the monitor configuration list and the array of monitors.

A second entry point is when a monitor plug/unplug event occurs as represented or at step 604. In either entry, step 606 is performed to determine and test a current monitor configuration, and update the monitor configuration list. In general, each monitor ID of each monitor of the current monitor configuration is obtained, using a graphics interface/instrumentation API call or other suitable method, as described above. The binary search tree is then used to search for the monitor ID(s), as represented by step 608.

As represented by step 610, depending on whether there was a search failure on any of the monitor IDs, the determination of the new monitor configuration will take one of two different branches. Thereafter, as described below, once the monitor configuration is determined and tested, the monitor configuration list is updated and the connection between the monitor configuration list and the array of monitors is updated.

Figure 7:
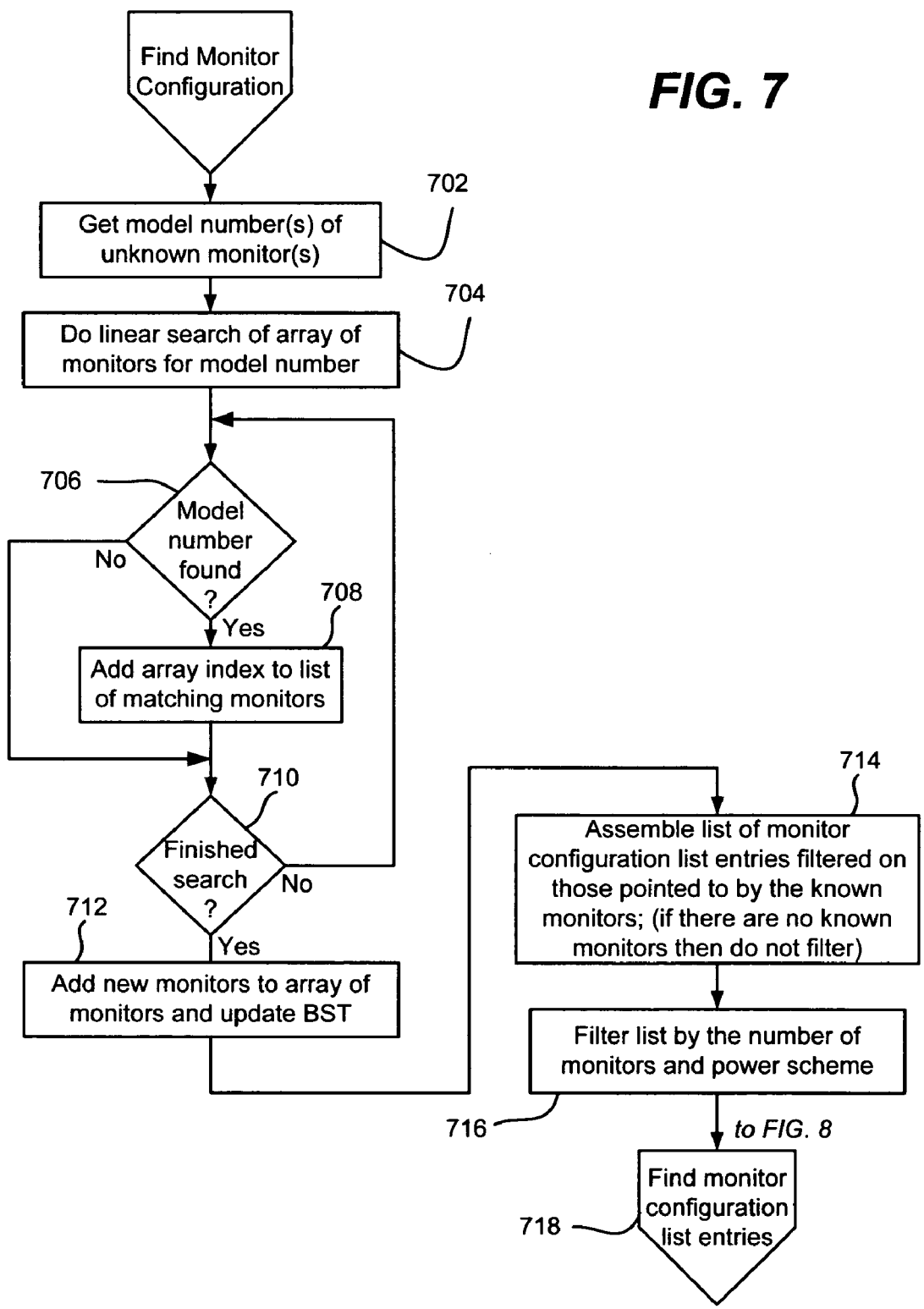

If some or all the monitor IDs were not found, the process branches to step 612, which represents moving to further steps represented in FIG. 7. Conversely, if all the monitor IDs were found, then at step 610 the process branches to steps 614, 616 and 618, in which the pointers to the monitor configuration list in each array element associated with the monitor IDs are compared, and those monitor configuration list entries pointed to by each monitor are added to a linked list of monitor configuration list entries at step 616. Because the monitor configuration list entries may include monitor configurations that were recorded under a different power scheme, or if the new monitors were a subset of a larger monitor configuration to get a better match the monitor configuration list entries may be filtered, (step 618). To accomplish this, a linked list iterator skips over those linked list nodes that point to monitor configuration list entries recorded under a different power scheme or number of monitors that differs from the current state. At this time, best monitor configuration list entry is found, as represented by step 620 moving to FIG. 8.

Returning to step 610, if there are one or more monitors having a monitor ID that was not found (steps 608 and 610, referred to as "unknown monitors"), the process branches to FIG. 7. At this time, if not already known (e.g., if the entire EDID was previously returned to the manager 212), an API/method call is used at step 702 to obtain the model number of the each monitor having a monitor ID that was not found. More particularly, for those monitors that failed a search of the binary search tree, another (e.g., linear) search through the array of monitors is performed at step 704 to find a set of monitors having the same model number.

It is possible that this search will fail as evaluated at step 706, however if so, the identified monitors will form a subset of the monitors that are in a monitor configuration list entry. The array elements of this set are used along with the array elements found through the binary search tree to create the monitor configuration list entry linked list, as was done in the known monitor algorithm. In this example, when the model number is found at step 706, the pointers to the monitor configuration list in each array element associated with the monitor IDs are compared and those monitor configuration list entries pointed to by each monitor are added to a linked list of monitor configuration list entries at step 708. Step 710 repeats for each unknown monitor.

Because the monitor configuration list entries may include monitor configurations that were recorded under a different power scheme, or if the new monitors were a subset of a larger monitor configuration, to get a better match the monitor configuration list entries may be filtered, (step 714). To accomplish this, a linked list iterator skips over those linked list nodes that point to monitor configuration list entries recorded under a different power scheme or number of monitors that differs from the current state.

After this is accomplished, the unknown monitor is added to the array of monitors and the binary search tree is rebalanced or rebuilt. At this point the unknown monitor(s) are known, but there are no pointers to the monitor configuration list. The connection between the array of monitors and the monitor configuration list will be made once a new monitor configuration is set in place, as described above. At this time, best monitor configuration list entry is found, as represented by step 716 moving to FIG. 8.

Figure 8:
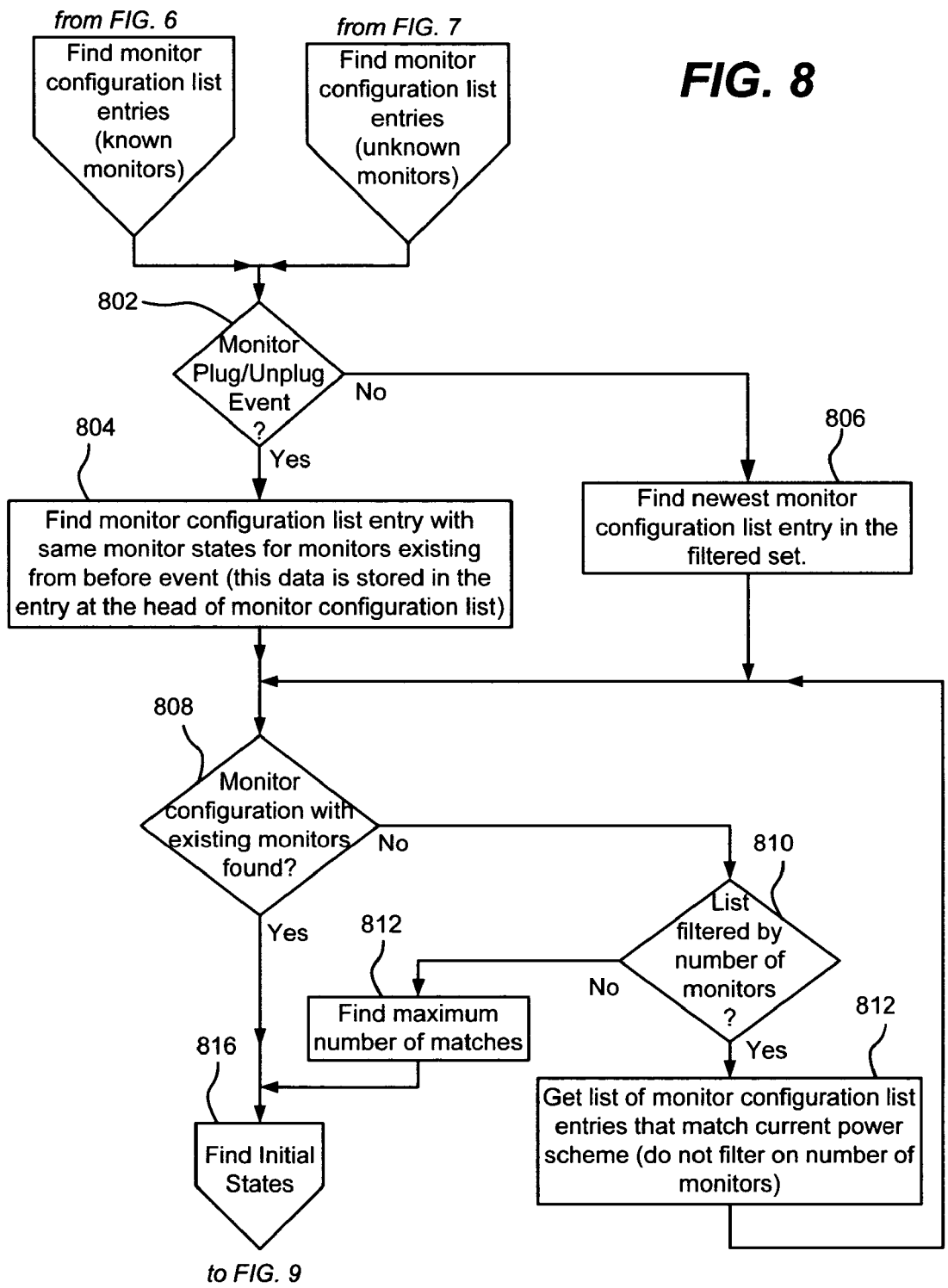

The example steps of FIG. 8 may be executed to find a best entry in the monitor configuration list from the filtered list of entries. This entry may have the same monitors as the new monitor configuration, or it may include other monitors. Note that if there are no monitor configuration list entries the process may advance to iterate video modes on unknown monitor (s), as described below.

If the transient monitor manager 212 is currently executing the process because of a monitor plug/unplug event, as essentially reevaluated at step 802, one aspect avoids changing the states of the existing monitors, which is achieved by looking for monitor matches with the same states as the pre-event configuration. The monitor states of the pre-event configuration are located at the head of the monitor configuration list (as it is the most recently used configuration). At step 804, a search is performed on the list of monitor configuration list entries to find monitor configurations that include the new monitor (if a plug event) along with the existing monitors and states. If there are multiple matches, the most recent monitor configuration list entry is used. If instead the transient monitor manager 212 is currently executing the process because of a monitor plug/unplug event, then the most recent monitor configuration list entry with the monitors of the new configuration is chosen at step 806.

If a monitor configuration list entry is not found at step 808, then, if not being filtered by the number of monitors (step 810), the iterator for the linked list of monitor configuration list entries is adjusted at step 812 so as to no longer use the number of monitors to filter the list. Once again a search is performed on the list of monitor configuration list entries by returning to step 808.

If at step 810, when not filtered by the number of monitors and a monitor configuration list entry is still not found, it is possible that not all of the monitors have been in the same configuration before, e.g., monitors A and B have been in a configuration together, but not in combination with monitor C. A solution is to find the monitor configuration list entry with the most monitor matches, as represented at step 812; in the above example, the solution finds a monitor configuration list entry with monitors A and B. This leaves monitor C without a known state, (which is resolved in FIG. 9).

Figure 9:
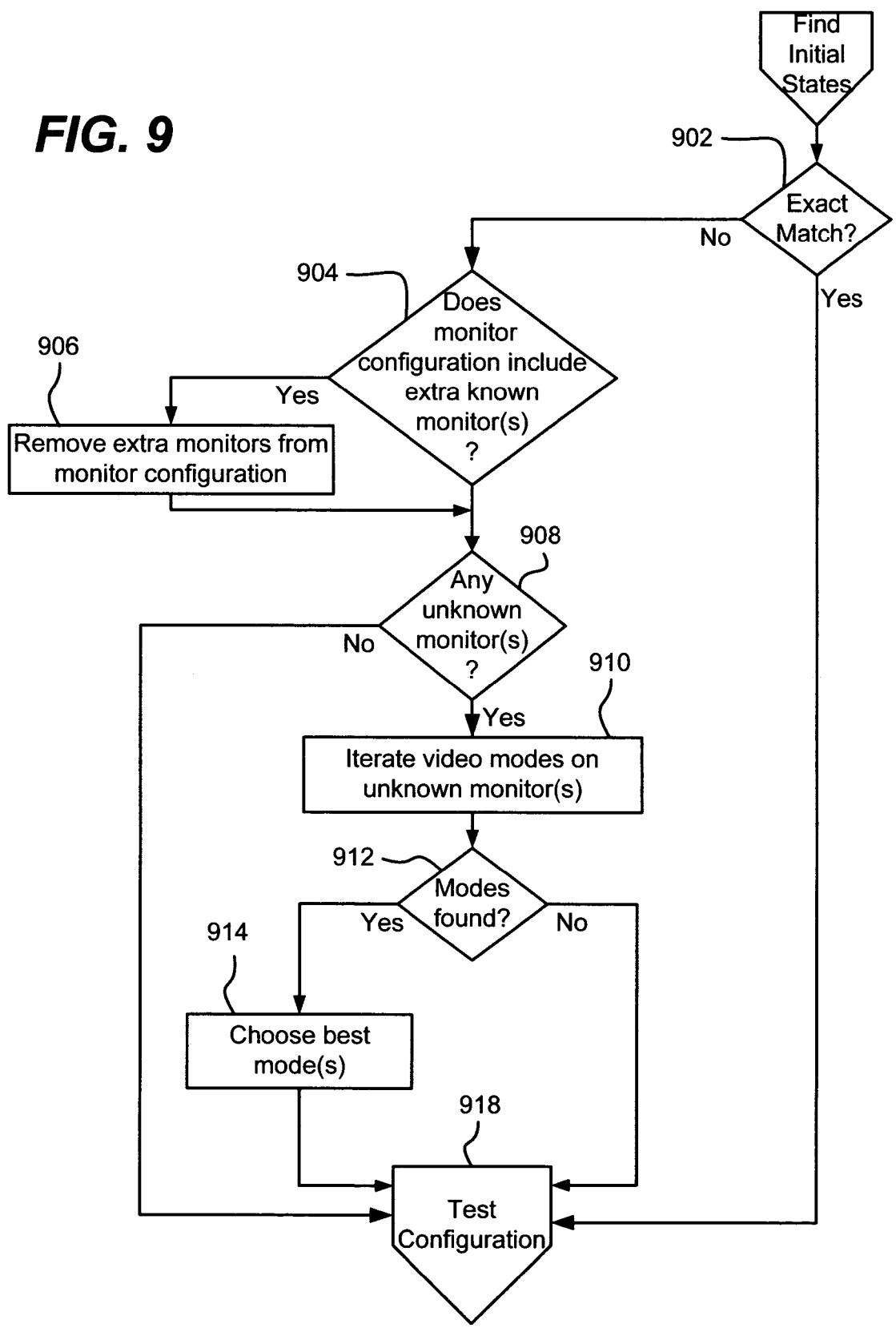
Figure 10:
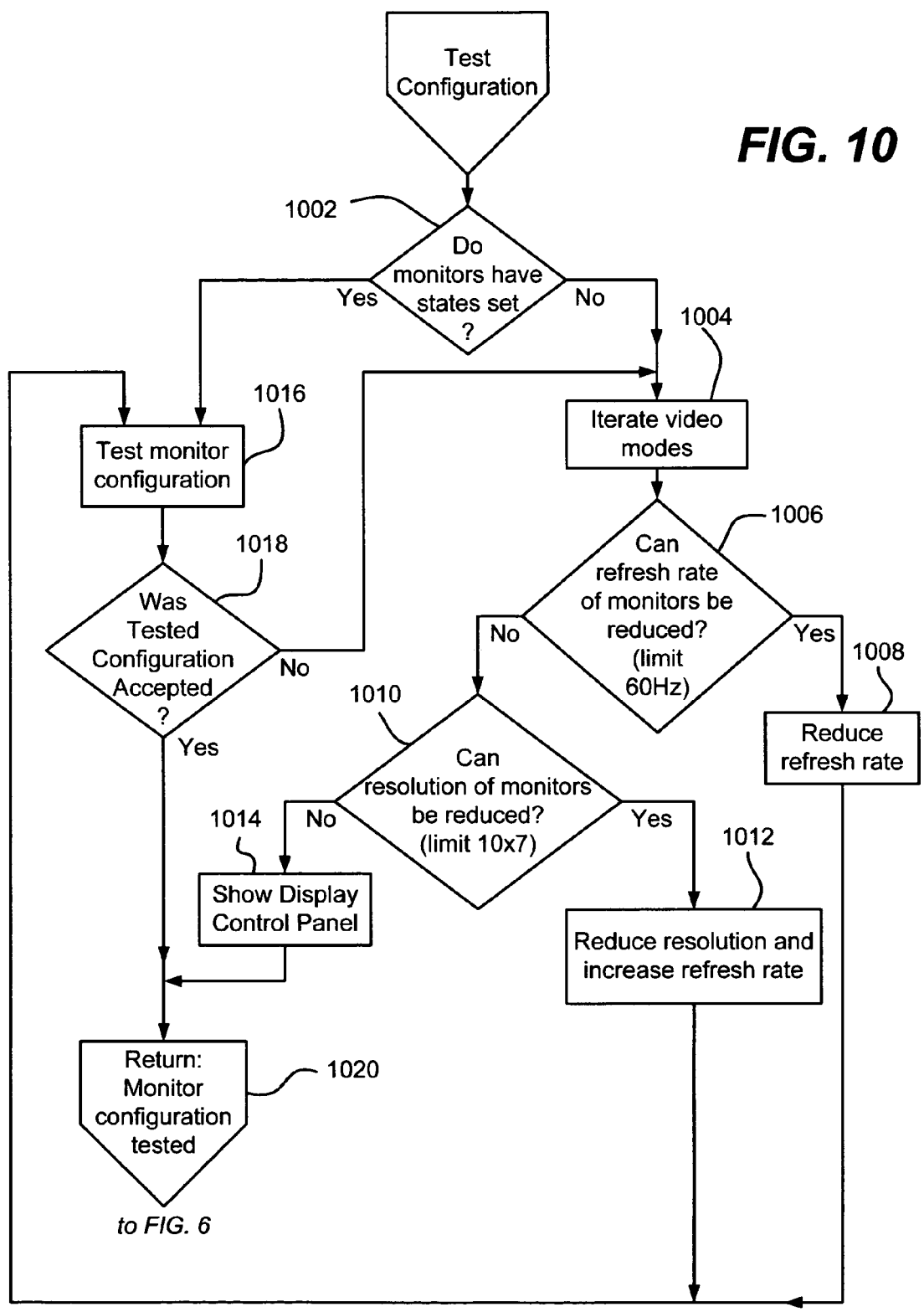

As represented in FIG. 9 via step 902, if the search for a monitor configuration list entry results in an exact match for the monitors and states, a next step 918 is to test the configuration against the video card's capabilities, by advancing to FIG. 10. However if the search did not provide for an exact match, e.g., due to extra monitors or monitors not having established video states, step 902 branches to step 904 before testing the monitor configuration.

More particularly, at step 904, if there are monitors in the monitor configuration list entry that are not in the new configuration, they need to be removed via step 906. Also, if there are monitors without an associated video state, the monitor is queried for its available modes via steps 908 and 910. If modes are found at step 912, the best match needs to be found, which is performed at step 914 by testing the monitor configuration against the video settings. If these settings are accepted, then that monitor configuration may be used.

Before the transient monitor manager 212 process ends, the monitor configuration is tested. This is because even if an exact match was found in the monitor configuration list, it is possible that the video card has since been switched out, and a previously valid monitor configuration will no longer work with the new card. It is also possible that the search for video modes (step 912) failed, leaving a monitor without a set state. FIG. 10 represents example testing steps.

If at step 1002 any of the monitors does not have a state set on it before testing, or if the monitor configuration fails when tested against the video settings (steps 1016 and 1018), the available video modes are iterated (step 1004). If possible to reduce the refresh rate (as evaluated against a limit at step 1006), a first attempt does so at step 1008 and tests against the video card's capabilities by advancing to step 1016. If reducing the refresh rate fails repeatedly until reaching the (e.g., 60 Hz) limit, a next step reduces the resolution of the monitors, if possible, as performed via steps 1010 and 1012. Note that whenever the resolution of the monitors is reduced, the refresh rate may be increased and the video settings again tested, reducing the refresh rate (as necessary) in a nested loop down to its minimum limit. If ultimately the available modes fail, a display control panel dialog is shown at step 1014. Note that although not shown, one or more attempts may be made to reduce the color depth before showing the display control panel.

When testing is completed as represented by FIG. 10 returning to step 622, step 624 is executed to update and use the monitor configuration list. In this manner, an existing configuration is applied, or a new one built for the current monitor set and their current states.

As can be seen from the foregoing detailed description, there is provided a system and method that simplifies the user experience when connecting to one or more display mechanisms, in a flexible manner that handles many possible user scenarios. By applying an established configuration when one matches, or by making an intelligent guess when not matched, users are given generally desirable results often without requiring user interaction.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system capable of displaying information on a plurality of display mechanisms, a method for dynamically configuring the display settings of the system to customize the system to the combination of the plurality of display mechanisms, the method comprising:

in a computer system having a first display mechanism connected thereto, receiving an indication that a second display mechanism has been connected to the computer system;

evaluating information received from the second display mechanism to identify the second display mechanism;

using the identity of the second display mechanism, searching a data structure for an entry indicating that the second display mechanism has been previously connected to the computer system concurrently with the first display mechanism, wherein the data structure contains entries corresponding to previous combinations of display mechanisms that have concurrently been connected to the computer system;

upon failing to locate an entry corresponding to the combination of the first and second display mechanisms, searching the data structure for an entry corresponding to a combination of display mechanisms that is similar to the combination of the first and second display mechanisms;

upon locating an entry corresponding to a similar combination, using the entry to access configuration data corresponding to the similar combination; and applying the configuration data to the combination of the first and second display mechanisms.

2. The method of claim 1 wherein the information received from the second display mechanism is received by querying the second display mechanism for capability information.

3. The method of claim 2 further comprising, testing settings based on the capability information with a currently installed video card.

4. The method of claim 3 wherein the test does not succeed, and further comprising, iterating to test different settings.

5. The method of claim 1 wherein the information received from the second display mechanism comprises an identifier.

6. The method of claim 1 wherein applying the configuration data to the combination of the first and second display mechanism comprises applying a set of video-related settings to the combination, the set containing at least one setting from among: a resolution setting, a refresh rate setting, a color depth setting, an orientation setting, a brightness setting, a contrast setting, a video head state setting, and/or a dots per inch setting.

7. The method of claim 1 further comprising, creating a new entry in the data structure corresponding to the combination of the first and second display mechanisms.

8. The method of claim 1 wherein searching the data structure for an entry corresponding to a combination of display mechanisms that is similar comprises comparing the Extended Display Identification Data of each display mechanism in the combination to the Extended Display Identification Data of each display mechanisms of a combination that has been previously stored in the data structure.

9. The method of claim 1 wherein the similar combination is a combination in which the first display mechanism was most recently used.

10. The method of claim 1 wherein searching the data structure for an entry corresponding to a combination of display mechanisms that is similar comprises comparing capabilities of each monitor in the combination.

11. The method of claim 1 wherein searching the data structure for an entry corresponding to a combination of display mechanisms that is similar comprises searching the data structure for a combination that includes the first and second display mechanism in addition to one or more other display mechanisms.

12. At least one computer-readable storage medium having stored computer-executable instructions, which when executed perform a method for dynamically configuring the display settings of a computer system to customize the system to the combination of the plurality of display mechanisms, the method comprising:
   in a computer system having a first display mechanism connected thereto, receiving an indication that a second display mechanism has been connected to the computer system;
   evaluating information received from the second display mechanism to identify the second display mechanism;
   using the identity of the second display mechanism, searching a data structure for an entry indicating that the second display mechanism has been previously connected to the computer system concurrently with the first display mechanism, wherein the data structure contains entries corresponding to previous combinations of display mechanisms that have concurrently been connected to the computer system;
   upon failing to locate an entry corresponding to the combination of the first and second display mechanisms, searching the data structure for an entry corresponding to a combination of display mechanisms that is similar to the combination of the first and second display mechanisms;
   upon locating an entry corresponding to a similar combination, using the entry to access configuration data corresponding to the similar combination; and
   applying the configuration data to the combination of the first and second display mechanisms.

13. The computer-readable storage medium of claim 12 further comprising persisting the configuration data, wherein persisting the configuration data includes writing information to a persistent store, the information including at least one setting of a set of display mechanism settings, the set containing: a resolution setting, a refresh rate setting, a color depth setting, an orientation setting, a brightness setting, a contrast setting, a video head state setting, and/or a dots per inch setting.

14. The computer-readable storage medium of claim 13 wherein persisting the configuration data further includes writing geometry information to a data store.

15. The computer-readable storage medium of claim 12 further comprising, testing video-related settings for the second display mechanism with a currently-installed video card, and if the test does not succeed, iterating to test different video-related settings.

16. The computer-readable storage medium of claim 12 further comprising, receiving information corresponding to user changes to the configuration data, and further comprising, persisting the changes.

17. In a computer system, a subsystem comprising:
   a display mechanism manager component that receives information about changes to a current display mechanism configuration;
   a data store containing entries corresponding to combinations of display mechanisms that previously have been connected concurrently to the system and display mechanism configuration data corresponding to the combinations of display mechanisms; and
   wherein the display mechanism manager component updates the data store with updated display mechanism configuration data by performing a method when a change to the current configuration is made by connecting a second display mechanism while a first display mechanism is concurrently connected, the method comprising:
      receiving an indication that the second display mechanism has been connected to the computer system;
      evaluating information received from the second display mechanism to identify the second display mechanism;
      using the identity of the second display mechanism, searching the data store for an entry indicating that the second display mechanism has been previously connected to the computer system concurrently with the first display mechanism;
      upon failing to locate an entry corresponding to the combination of the first and second display mechanisms, searching the data structure for an entry corresponding to a combination of display mechanisms that is similar to the combination of the first and second display mechanisms;
      upon locating an entry corresponding to a similar combination, using the entry to access display mechanism configuration data corresponding to the similar combination;
      applying the display mechanism configuration data to the combination of the first and second display mechanisms; and
      storing an entry and the display mechanism configuration data in the data store corresponding to the combination of the first and second display mechanisms.

18. The subsystem of claim 17 wherein the method further comprises testing video-related settings for the second display mechanism with a currently-installed video card, and if the test does not succeed, iterating to test different video-related settings.

19. The subsystem of claim 17 wherein applying the display mechanism configuration data to the combination of the first and second display mechanisms further comprises customizing the display mechanism configuration data to capability information corresponding to the second display mechanism.

20. In a computer system capable of displaying information on a plurality of display mechanisms, a method for dynamically configuring the display settings of the system to customize the system to the combination of the plurality of display mechanisms, the method comprising:
   in a computer system having at least three display mechanisms connected thereto, receiving an indication that one of the at least three display mechanisms has been disconnected from the computer system;

querying the remaining connected display mechanisms to determine the identity of each of the display mechanisms;

using the identity of each of the remaining display mechanisms, searching a data structure for an entry indicating that the corresponding display mechanism has been previously connected to the computer system concurrently with the remaining one or more display mechanisms, wherein the data structure contains entries corresponding to previous combinations of display mechanisms that have concurrently been connected to the computer system;

upon failing to locate an entry corresponding to the combination of the remaining display mechanisms, searching the data structure for an entry corresponding to a combination of display mechanisms that is similar to the combination of the remaining display mechanisms;

upon locating an entry corresponding to a similar combination, using the entry to access configuration data corresponding to the similar combination; and applying the configuration data to the combination of the remaining display mechanisms.

* * * * *